United States Patent [19]

Knecht et al.

[11] Patent Number: 4,785,920
[45] Date of Patent: Nov. 22, 1988

[54] HYDRAULIC ADJUSTABLE SHOCK ABSORBER

[75] Inventors: Heinz Knecht, Eitorf; Alfred Preukschat, Königswinter, both of Fed. Rep. of Germany

[73] Assignee: Boge AG, Eitorf, Fed. Rep. of Germany

[21] Appl. No.: 36,307

[22] Filed: Apr. 9, 1987

Related U.S. Application Data

[63] Continuation-in-part of Ser. No. 915,265, Oct. 3, 1986, Pat. No. 4,749,069.

[30] Foreign Application Priority Data

Apr. 16, 1986 [DE] Fed. Rep. of Germany ....... 3612796

[51] Int. Cl.⁴ .................. B60G 13/08; F16F 9/46
[52] U.S. Cl. .................................. 188/299; 188/279; 251/129.05
[58] Field of Search .............. 188/279, 299, 313, 311, 188/316; 251/129.05; 137/487.5

[56] References Cited

U.S. PATENT DOCUMENTS

| | | | |
|---|---|---|---|
| 3,446,473 | 5/1969 | Barker | 251/129.05 X |
| 3,476,128 | 11/1969 | Barker | 251/129.05 X |
| 3,523,676 | 8/1970 | Barker | 251/129.05 |
| 4,313,465 | 2/1982 | Holzem et al. | 251/129.05 X |
| 4,589,528 | 5/1986 | Axthammer et al. | 188/279 |

FOREIGN PATENT DOCUMENTS

| | | |
|---|---|---|
| 1242945 | 6/1967 | Fed. Rep. of Germany . |
| 2119531 | 11/1971 | Fed. Rep. of Germany . |
| 0112820 | 7/1983 | Japan .................... 188/299 |
| 0174773 | 10/1983 | Japan ................. 251/129.05 |
| 0197832 | 9/1986 | Japan .................... 188/299 |

Primary Examiner—Andres Kashnikow
Assistant Examiner—Matthew C. Graham
Attorney, Agent, or Firm—Nils H. Ljungman

[57] ABSTRACT

Shock absorber for motor vehicles, on which there is a damping element, which exhibits a working cylinder to hold a working medium, divided by a piston into two working chambers, whereby an electromagnetically-activated and axially-movable valve body of the valve pressurizes a flow passage, at least partly to control the damping force. The object of the invention is to make possible a variable damping adjustment, whereby by means of a variably-controllable damping valve, an adjustable damping of the decompression and compression stages can be achieved. In addition, by variation of the effective hydraulically-influenced functional surfaces of the valve body, the switching, frequency, closing and opening action of the valve body, designed as the armature of an electromagnet, can be influenced. The object is achieved by the formation of a valve seat by a seat surface oriented at approximately right angles to the valve body, together with the end surface of the valve body and of the valve seat are at a distance from one another. As a result of this configuration, a partial pressure reduction can be achieved in the vicinity of the valve seat, which influences the valve body.

15 Claims, 9 Drawing Sheets

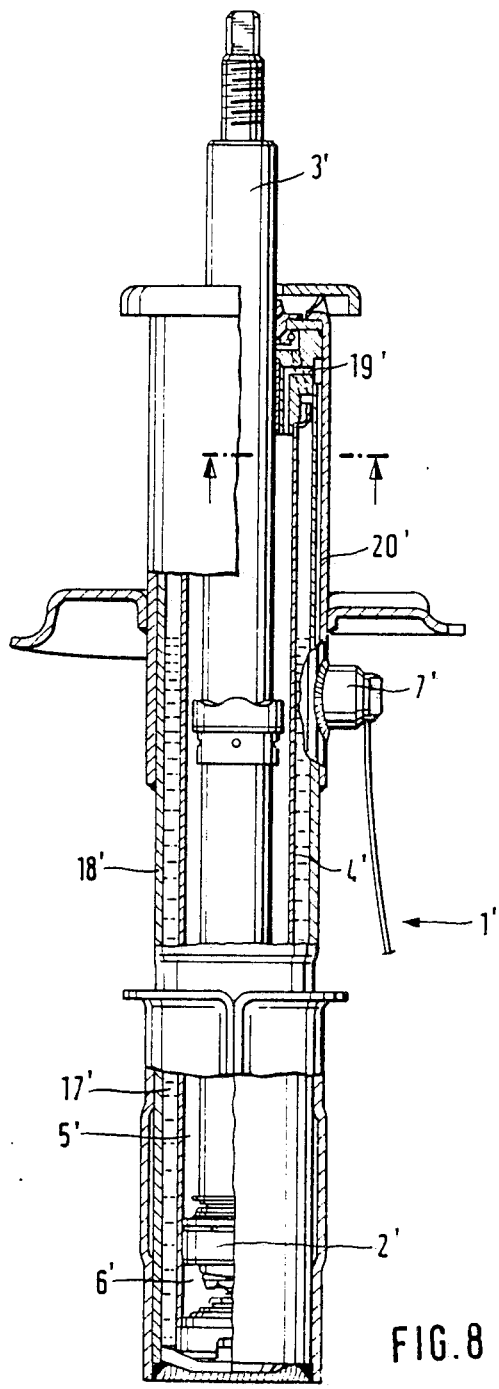
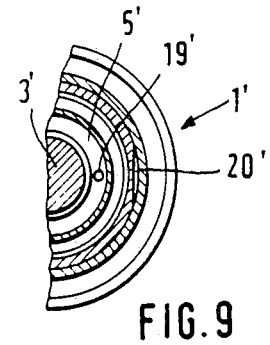
FIG. 9
FIG. 8

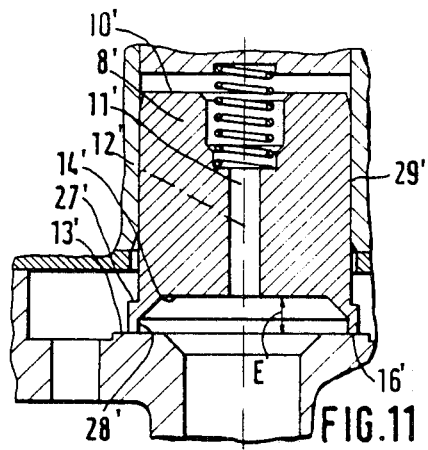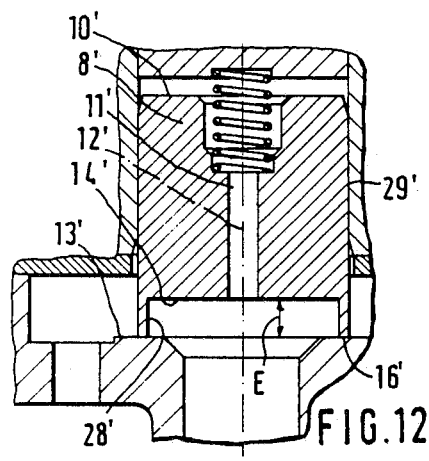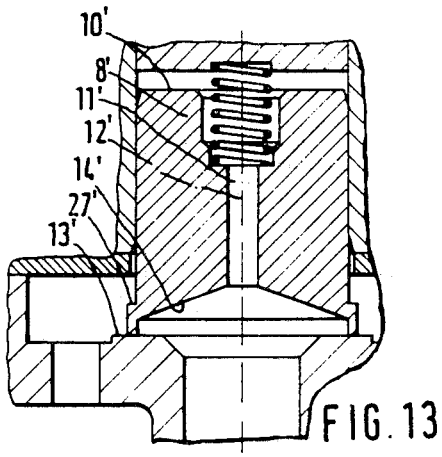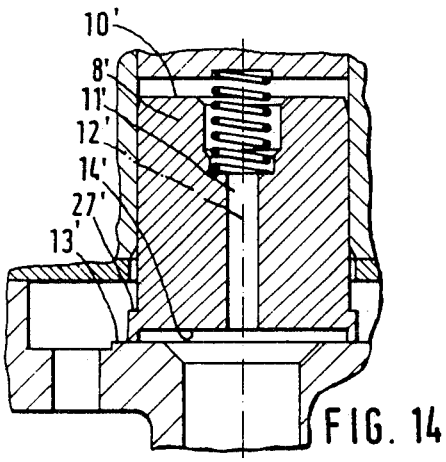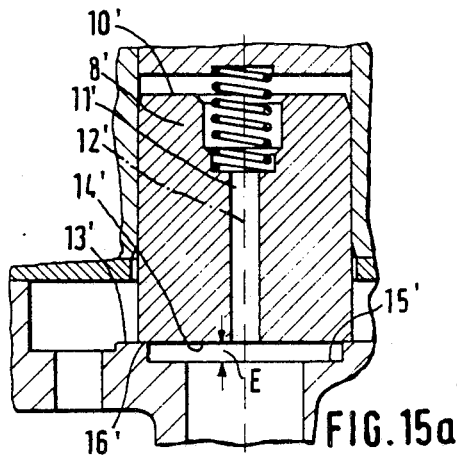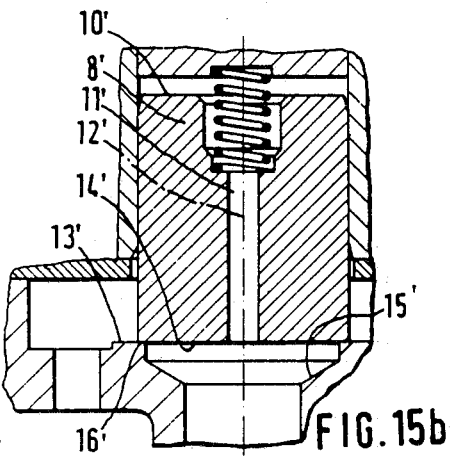

HYDRAULIC ADJUSTABLE SHOCK ABSORBER

This application is a continuation-in-part of application Ser. No. 915,265 now U.S. Pat. No. 4,749,069, filed on Oct. 3, 1986, entitled "A Vibration Damper for Motor Vehicles Having an Arrangement for Varying Damping Thereof", which corresponds to Federal Republic of Germany patent application No. P 35 35 287.6-21, filed on Oct. 3, 1985.

CROSS-REFERENCE TO CO-PENDING APPLICATIONS AND PATENTS

Co-pending application Ser. No. 735,452 (Attorney Docket No. NHL-BGG-06), filed on May 17, 1985, entitled "Adjustable Hydraulic Shock Absorber", which corresponds to Federal Republic of Germany Application No. P 34 18 262.4, filed May 17, 1984 co-pending application Ser. No. 778,606 filed on Sept. 20, 1985, entitled "Hydraulic Adjustable Shock Absorber", which corresponds to Federal Republic of Germany Application No. P 34 34 877.8, filed Sept. 22, 1984, for which U.S. application the issue fee was paid for on Nov. 3, 1986; co-pending application Ser. No. 772,316, filed on Sept. 4, 1985, entitled "Hydraulic Vibration Damper Having Adjustable Damping Valve", which corresponds to Federal Republic of Germany Application No. P 34 32 465.8, filed Sept. 4, 1984: co-pending application Ser. No. 864,451 filed on May 16, 1986, entitled "Adjustable Hydraulic Vibration Damper", which corresponds to Federal Republic of Germany Application No. P 35 18 327.6, filed May 22, 1985: and co-pending application Ser. No. which is to be filed on Mar. 22, 1987, entitled "Adjustable Shock Absorber", which corresponds to Federal Republic of Germany Application No. P 36 09 862.0, filed Mar. 22, 1986, all of which are assigned to at least one of the same assignees as the instant application, are incorporated herein by reference as if the texts thereof were fully set forth herein Additionally, issued U.S. Pat. Nos. 4,635,765, issued Jan. 13, 1987, entitled "Adjustable Hydraulic Damper Apparatus" and 4,577,840, issued Mar. 25, 1986, entitled "Self-pumping Hydropneumatic Spring Leg or Strut With Internal Level Control For Motor Vehicles", both relate to similar subject matter as the instant application, are assigned in common with the instant application and are incorporated herein by reference as if the texts thereof were fully set forth herein.

BACKGROUND OF THE INVENTION

1. Field of the Invention

The invention relates to a shock absorber and more particularly to a hydraulic, adjustable shock absorber with a piston fastened to a piston rod, which divides a working cylinder into two working chambers filled with damping fluid, whereby at least partly for control of the damping force, an electromagnetically-activated and axially-movable valve body of a valve pressurizes a flow passage, whereby the valve body is provided with a hydraulic connection running from the flow passage to the rear end surface of the valve body.

2. Description of the Prior Art

The prior art includes hydraulic shock absorbers, for example, German Patent Publication Published for Opposition Purposes No. 12 42 945, whose damping characteristic can be regulated electromagnetically by means of the damping valves, by changing the flow of the hydraulic damping medium. There is a bypass connection, which is used to regulate the damping force in the decompression stage. To change the damping force in the presence of varying road conditions in the decompression stage, there is a bypass connection, in which there is an electromagnetically controlled valve. The flow passage is controlled by the valve body by means of a suitably large electromagnet Hydraulic, adjustable dampers are also known, for examples, German Laid Open Patent Application No. 21 19 531, in which there is a first damping element and also a line equipped with a control valve. In a closed loop, there is a control valve and a damping element, each arranged separately. The adjustment of the control valve is either done manually or by the action of one of the vehicle mechanisms. Each of the above-mentioned patents are incorporated by reference as if the entire contents thereof were fully set forth herein

OBJECT OF THE INVENTION

The object of the invention is to design a vehicle damping system with a variable, intelligent electronic damping adjustment for the decompression and compression stages, so that by means of a compact, variable and controllable damping valve, not only can any desired damping be set in the decompression and compression stages, but by varying the effective hydraulically-influenced functional surfaces of the valve body, the switching, frequency, closing and opening action of the armature of the electromagnet designed as the valve body can be influenced.

SUMMARY OF THE INVENTION

This object is achieved in that a seat surface oriented at approximately right angles to the axis of rotation of the valve body, together with the end surface of the valve body, forms a valve seat, and that at least a portion of the end surface of the valve body and of the valve seat are located at a distance from one another.

An advantage of this solution is that such a damping valve, or variants thereof, can be installed in the vibration damping system of a motor vehicle. The possibility exists of orienting the damping valve parallel to the conventional throttle valves in the damping piston and-/or in the cylinder bottom, or it can be located in the damping piston and only the check valves, if any, can be located in the cylinder bottom, so that the damping valve is installed in a bypass. In applications with lockable vibration dampers, the damping valve can be installed without other throttle valves being located in the damping piston and in the vicinity of the bottom.

Another advantage is that by optimizing the hydraulically-influenced functional surfaces of the valve body in relation to one another, a rapid and secure closing and opening action can be achieved under all operating conditions, which makes possible a compact construction with a low electric power consumption. On account of the configuration as an electromagnetic seat valve with an axially-movable valve body in a slot guide, and the fact that the valve body can be pressurized on both end surfaces, the valve can be opened by means of magnetic force, and closed by means of the elasticity and hydraulic pressure of the damping system itself. This makes possible the use of very small electromagnets, since only a small amount of electric power is necessary.

In one configuration of the invention, the valve body has a cylindrical outside surface.

In accordance with one essential feature, the pressurized end surface of the valve body located at a distance is smaller that the rear pressurized end surface of the valve body. It is advantageous that in the vicinity of the valve seat, there is a differential pressure force on the valve body. Consequently, of course, the valve body is pressurized on both end surfaces by means of the hydraulic connection, theoretically with the same pressure, but in the vicinity of the valve seat, when the valve is open, the flowing damping agent creates a partially reduced pressure compared to the environment of the valve seat. This differential pressure is used to reinforce the valve spring, so that when the electromagnet is turned off, not only does the valve spring close the valve body, but at the same time the partial pressure reduction exerts a force on the valve body. This additional force makes possible a rapid closing action under all operating conditions, whereby the switching time decreases with increasing relative velocity of the vibration damper.

A particularly favorable embodiment of the invention provides that the valve body, in the vicinity of the valve seat, has an outside diameter which is larger than the outside surface used to guide the valve body, and the pressurized end surface of the valve body located some distance away is equal at the maximum to the pressurized rear end surface of the valve body.

In this configuration, there is an annular surface on the outside circumference of the valve body, which when the flow into the valve body comes radially from the outside, produces a closing force which reinforces the valve spring in closing the valve.

In one configuration of the invention, at least a portion of the end surface of the valve body runs conically.

Depending on the structural execution, another important feature of the invention provides that the end surface of the valve body is plane, and that there is a recess in the vicinity of the valve seat, which recess is located at a distance from the end surface of the valve body.

An advantage with this configuration is that the cylindrical valve body used has a plane end surface and is mechanically simple, and that there is a recess in the area adjacent to the valve seat.

In all solutions, the surface located at the distance E means that when the damping medium flows in below a determined pressure in the vicinity of the valve seat, on account of the reduction of the cross section, there is an increase in the velocity of the damping medium, so that the pressure drops accordingly. The design here is based on the "Bernoulli" effects. As a consequence of the resulting partial pressure reduction, the action of the valve body valve springs is reinforced. For the closing and opening action under all operating conditions, it is thereby unimportant whether the end surface of the valve body has a recess located at some distance from the valve seat surface, or whether the area adjacent to the valve seat has a recess located at some distance from the end surface of the valve body.

One aspect of the invention resides broadly in a shock absorber for motor vehicles. The shock absorber comprises a cylinder assembly having an arrangement for varying damping of a piston assembly disposed therein. The piston assembly divides the cylinder into at least two chambers, each for containing damping fluid. The shock absorber comprises an apparatus for throttling the damping fluid when the damping fluid moves from one of the chambers into another. The piston assembly has a piston rod and piston. The piston rod has a first apparatus for attachment of the piston rod at one end thereof. The cylinder assembly has a second apparatus for attachment at a portion thereon other than the first apparatus for attachment at the piston rod. The vibration damper has an apparatus for bypassing damping fluid and an arrangement for accepting bypassed damping fluid. The bypassing apparatus is disposed to bypass the damping fluid from one of the damping fluid-containing chambers to the accepting arrangement. The bypassing apparatus includes a damping valve arrangement for regulating flow of the damping fluid in the bypassing apparatus. The valving includes an electromagnetically-displaceable component for effecting flow cross section in the valving. The electromagnetically-displaceable component has a first and a second end surface. An electromagnet displaces the electromagnetically-displaceable component. The electromagnet has an arrangement for connection to electrical controlling apparatus. Valve seat apparatus includes a stationary seating surface and a first portion of the first end surface arrangement of the electromagnetically-displaceable component. The electromagnetically-displaceable component is axially displaced along a first axis. The seating surface has at least one portion which is disposed substantially at a right angle to the first axis, and a second portion of the first end surface arrangement of the electromagnetically-displaceable component is disposed a predetermined distance (E) away from the stationary seating surface arrangement when the valving means is closed.

BRIEF DESCRIPTION OF THE DRAWINGS

Preferred embodiments are illustrated schematically in the accompanying drawings.

FIG. 8 shows a shock absorber in partial section.

FIG. 9 shows a section through the shock absorber illustrated in FIG. 8, in the vicinity of the bypass.

FIGS. 11, 12, 13, 14, and 15a to 15b show various embodiments of the valve body in cross section.

DESCRIPTION OF THE PREFERRED EMBODIMENTS

Figure 1:
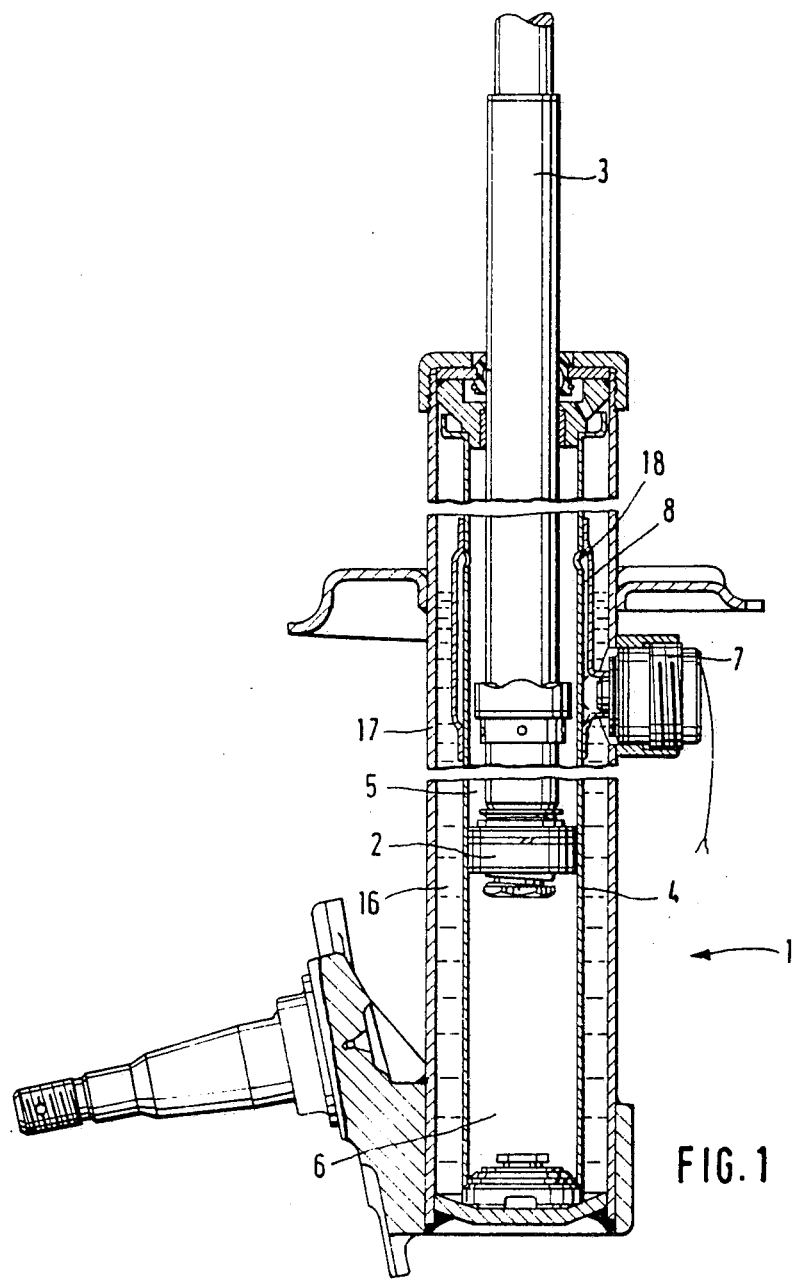
FIG. 1 shows a hydraulic shock absorber with a damping valve, in partial cross section.

The vibration damping system illustrated in FIG. 1 is a shock absorbing strut in a double-tube model. The theory of the invention, however, can also be applied in other types of shock absorbers, such as single-tube shock absorbers, gas shock absorbers, etc. The shock-absorbing strut 1 illustrated in FIG. 1 consists essentially of the work piston 2, the piston rod 3 and the work cylinder 4. The work piston 2 divides the work cylinder 4 into the upper work chamber 5 and the lower work chamber 6. The work piston 2 is also equipped with damping valves (not shown) which are well known in the prior art. In the floor of the work cylinder 4, there are other valves, over whose cross sections the volume displaced by the piston rod 3 is displaced into the equalization chamber 16. The equalization chamber 16 is formed by the wall of the work cylinder 4 and the inside wall of a jacket 17.

There is a flow connection into the equalization chamber 16 from the upper work chamber 5 via the boring 18, the bypass 8 and the damping valve 7. In this flow connection, the damping valve 7 controls a variable fluid circulation.

Figure 2:
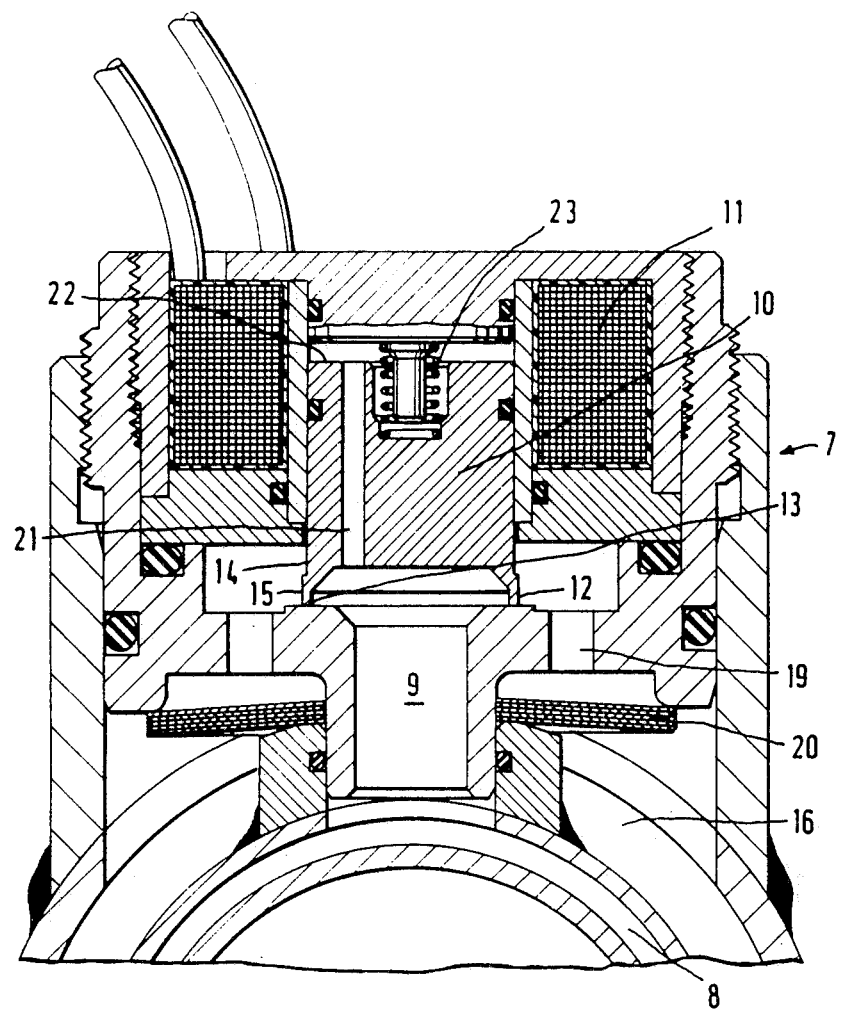
FIG. 2 shows a damping valve with an electromagnet in section, and in detail.

FIG. 2 shows a detail of a damping valve 7 whereby, starting from a bypass channel 8, the damping fluid travels through a passage 9, past a valve body 10, via borings 19 on a spring washer valve 20 into an equalization chamber 16. The valve body 10 is also the armature for an electromagnet 11. The valve body 10 is equipped, on its side facing the passage 9, with a sealing surface 12, which seals it against the passage 9. The boring 21 of the valve body 10 assures that, on the back side of the valve body 10, an appropriate work pressure is accumulated on an end surface 22. The sealing surface 12 of the valve body 10 exhibits an inside diameter 13, the surface of which is smaller than the end surface of the end 22, so that the work pressure of the shock absorber exerts a slight auxiliary closing force on the valve body 10. By achieving an appropriate relationship between the surface area of the end 22 and the area of the inside diameter 13, it is possible to exercise a favorable hydraulic action on the switchover intervals of the electromagnet. This hydraulic assist of the valve body 10 also makes possible the use of a switch valve return spring 23 with very low return forces. That increases the available magnetic force at the armature (valve body 10) of the damping valve 7, which is important for the switchover interval.

When the valve body 10 is open, the pressure determined by the damping valve 20 of the bypass valve acts via the surface formed by an outside diameter 14 and 15 of the valve body 10 as an auxiliary force on the closing process of the valve body 10 of the damping valve 7.

Figure 3:
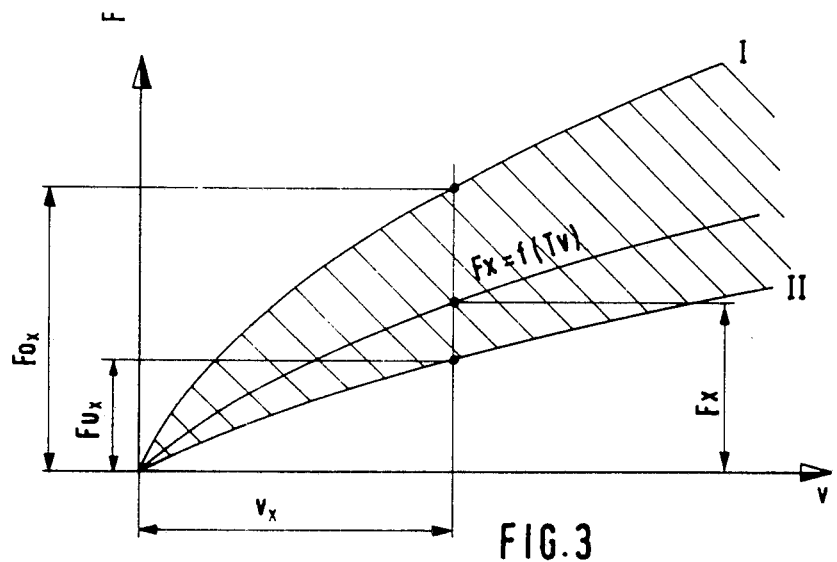
FIG. 3 shows a force-velocity diagram of an adjustable shock absorber with a bypass valve.

FIG. 3 is a force-velocity diagram of the shock-absorbing strut illustrated in FIG. 1. The damping force is plotted in relation to the piston velocity. Curve I represents the damping curve when the valve body 10 is closed. Curve II relates to the open valve body. Between the Curve I and the Curve II, there is a regulating field, which covers damping forces which can be achieved when the electromagnet 11 is correspondingly activated. If, for example, the damping force Fx is achieved at a piston velocity Vx, then a corresponding pulse width repetition rate is to be set, as shown in FIG. 4.

Figure 4:
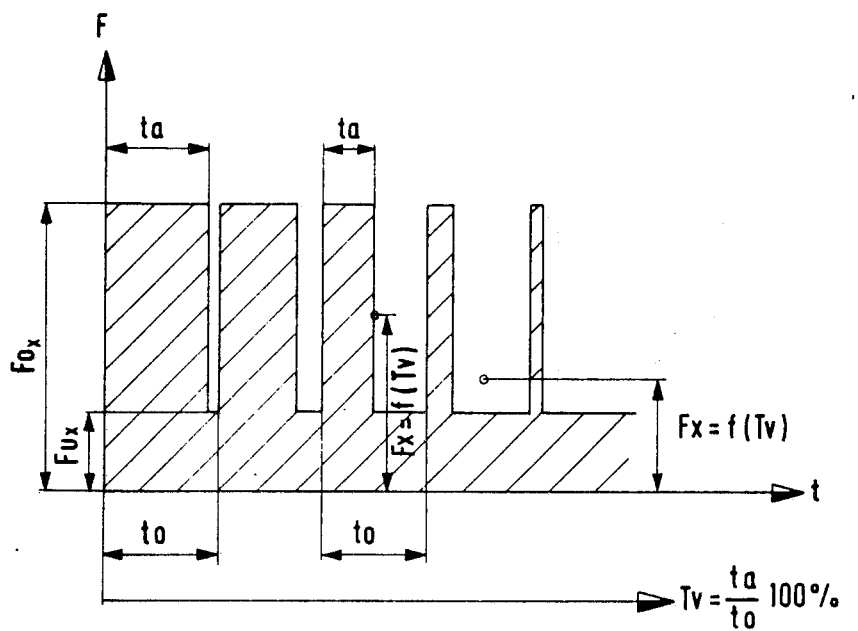
FIG. 4 is the diagram of a damping force action at the point Vx (piston velocity)

FIG. 4 shows one example for influencing the damping force at point Vx. It has been assumed, to make the diagram easier to understand, that Vx is constant over a rather long period of time t. The damping force curve $Fo_x$ is a point from the fundamental Curve I in FIG. 3. The damping force $Fu_x$ represents, at the same point Vx, a point of the fundamental Curve II of the curve shown in FIG. 3. In this diagram, the pulse width repetition rate is an important criterion. The pulse width repetition rate is defined as:

$$Tv = ta/to$$

In percentage form: $Tv\ (\%) = ta/to \cdot 100$

With a pulse width repetition rate of 100%, the fundamental Curve I is reached, since the bypass via the valve body 10 is closed. The closing time is specified at 100% during a time constant (to). If, at a pulse width repetition rate of 0, the bypass 8 via the valve body 10 is opened for the entire time of the time constant (to), then the lower fundamental Curve II applies. Now, if for example, a geometric mean value is achieved exactly halfway between the upper fundamental Curve I and the lower fundamental Curve II, then a pulse width repetition rate of 50% is necessary. With a pulse width repetition rate of 50%, one-half of the time constant (to), the valve body 10 is closed, and the other one-half of the time constant, it is open.

FIG. 4 shows that the damping force Fx can be varied between $Fo_x$ and $Fu_x$ as a function of the selection of the pulse width repetition rate Tv. The variation follows the formula:

$$Fx = Fo_x - (Fo_x - Fu_x) \cdot Tv$$

Where:
Fx = the damping force to be achieved:
$Fo_x$ = the upper damping force at a piston velocity Vx:
$Fu_x$ = lower damping force at a piston velocity Vx; and
Tv = pulse width repetition rate.

According to this formula, any other desired curve between these extreme fundamental curves can be achieved, by solving the formula for the pulse width repetition rate, and using the corresponding value to control the electromagnet 11. It can be seen that the regulating precision for the electromagnet for the value lying between the upper and the lower limit of the effective damping force Fx is a function of the level of the clock frequency of the electromagnet.

The idealized form of the force curve F over the time t shown in FIG. 4 does not occur in a practical application, since the construction and axle fastening elements of the shock absorber, the tires and other bearings in the geometry of the embodiment produce a rounded curve form, because of their elastic behavior.

Figure 5:
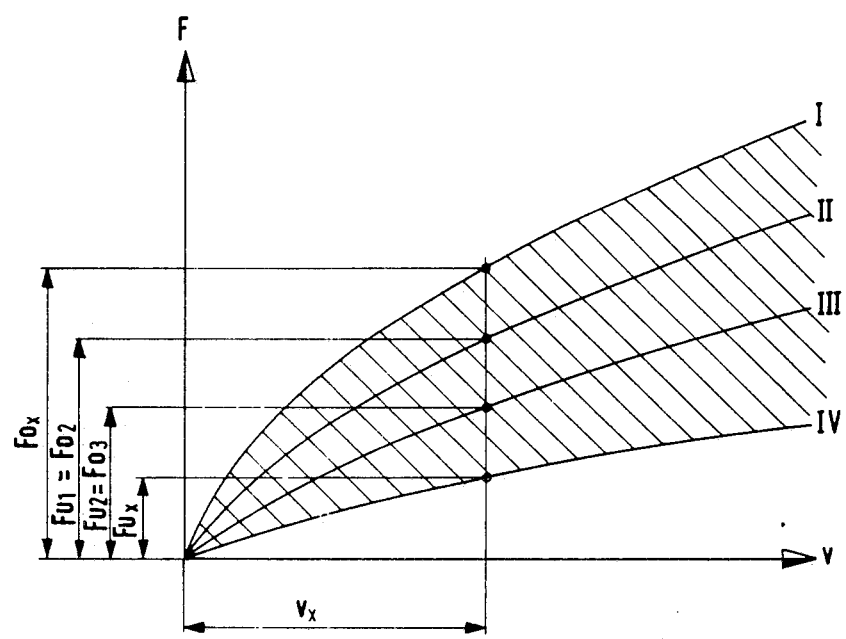
FIG. 5 is another force-velocity diagram with four different fundamental curves and, in relation to them, three corresponding partial regulating fields.

The force-velocity diagram shown in FIG. 5 includes curves which are obtained when, for example, two damping valves 7 are used. The goal of this application is to reduce the damping force discontinuity between Fo and Fu. When two damping valves 7 are used, the regulating field which can be affected by pulse width modulation can be divided into three partial fields, with reduced damping force discontinuities. The damping force fundamental Curves I to IV are achieved, as a function of the switching combination of the damping valves 7.

In the fundamental Curve I, both valve bodies 10 are closed. The fundamental Curve II shows a first valve body 10 open and the second valve body closed. The fundamental Curve III shows that the second valve body 10 is open and the first valve body, on the other hand, is closed. In the fundamental Curve IV, both valve bodies 10 are opened. This switching combination yields the ability to vary the curves in the individual partial regulating fields.

The partial regulating field 1 is covered by electronic activation of the electromagnet 11 of the first damping valve 7, while the second damping valve 7 remains closed. The partial regulating field 2 covers situations in which both damping valves 7 are operated by means of their electromagnets 11, whereby the signals run inverse to one another. In the partial regulating field 3, the second damping valve 7 is open, while the first damping valve 7 acts via its electromagnet on the valve body 10. In this diagram, too, the desired damping force Fx at the velocity Vx is achieved via the above-mentioned formula:

$$Fx = Fo_x - (Fo_x - Fu_x) \cdot Tv$$

The setting of the damping forces is therefore always guaranteed in a partial regulating field, and extreme damping force discontinuities can thereby be avoided.

Figure 6:
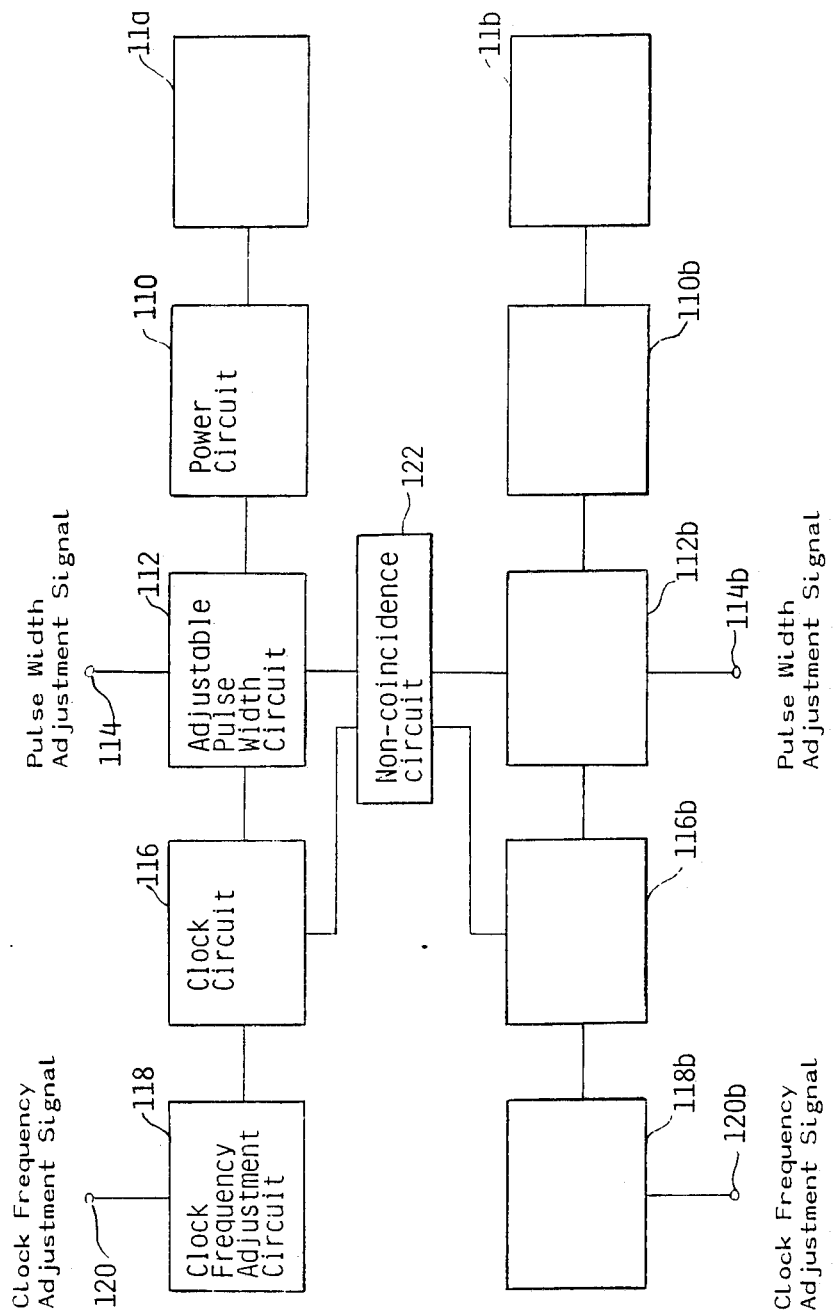
FIG. 6 shows a circuit for the operation of the electromagnets of the damping valve according to an embodiment of the invention.

FIG. 6 shows a circuit for the operation of the electromagnets 11 of the valve body 10. In FIG. 6, two separate electro magnets 11a and 11b are shown, each being associated with a different valve body 10. When the circuitry as shown in FIG. 6 operates, it corresponds to the operation which has been described hereinabove related to FIG. 5. If only one valve body 10 with a single electromagnet 11 is to be used, only one of the two circuits shown in FIG. 6 need be used.

Figure 10:
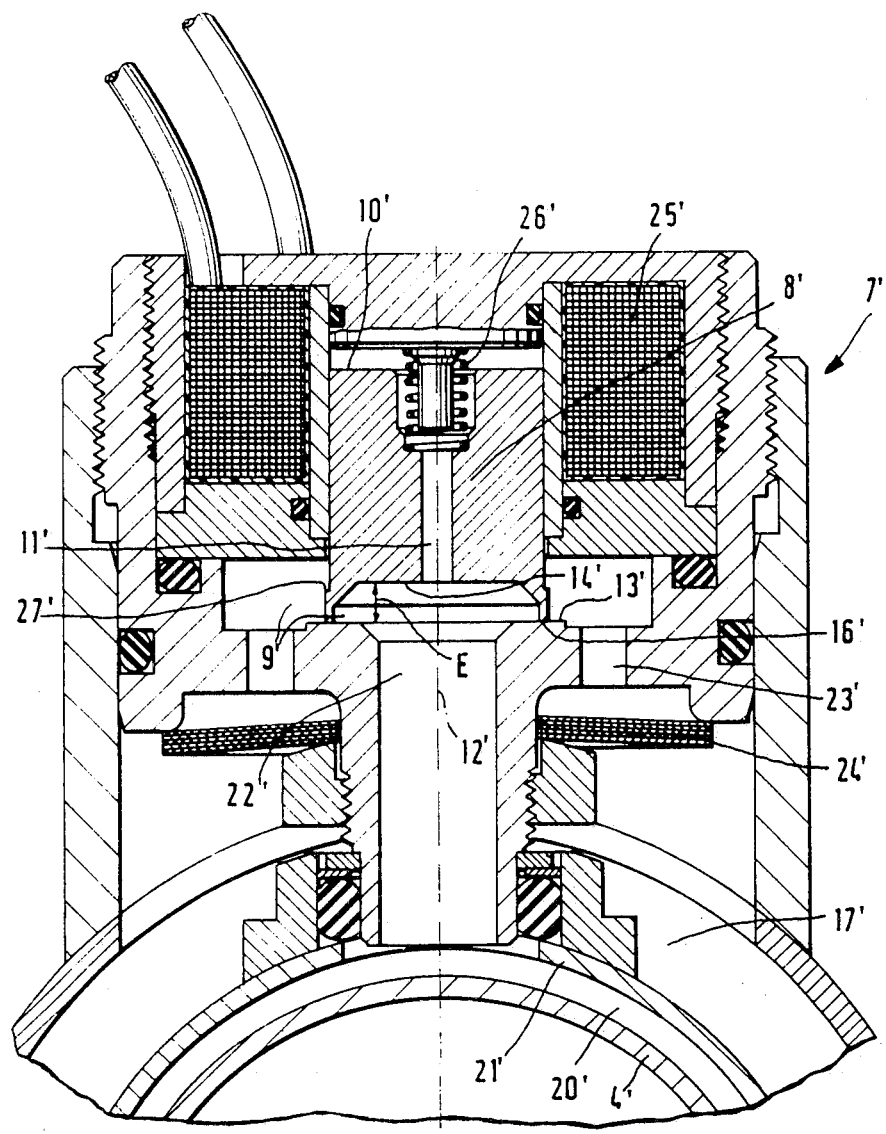
FIG. 10 shows an electromagnetically-activated valve in section.

As shown in FIG. 6, an electromagnet 11a is connected to a power circuit 110, which provides the voltage pulses for the activation of electromagnet 11a in accordance with the operation as shown in FIG. 4 or the electromagnet 25' of FIG. 10. The power circuit 110 is controlled by an adjustable pulse width circuit 112, which provides signals for the turning on and turning off of the power circuit 110, thereby providing the voltage pulses to the electromagnet 11a. The voltage pulses from the power circuit 110 may also be current pulses or a combination of current and voltage pulses. The pulse width of the adjustable pulse width circuit 112 is adjusted by an external signal which may enter preferably at a terminal 114 of the adjustable pulse width circuit 112. A clock circuit 116 is connected to the adjustable pulse width circuit 112 in order to provide a clock pulse for the adjustable pulse width circuit 112 for the starting of each and every pulse, preferably. In order to adjust the frequency of the clock circuit 116, if so desired, which frequency may be typically in the order of a few Hertz, for example, 2 to 3 Hertz to about 10 to 25 Hertz or even higher, depending upon the design of the electromagnet 11a, a clock adjustment circuit 118 is connected to the clock circuit 116, whereby the clock frequency may be altered depending upon the desires of the driver of the motor vehicle having the vibrational damping system of the present invention, or depending upon other sensors which are described in U.S. Pat. Nos. 4,577,5091; 4,587,850; application Ser. Nos. 700,451, filed on Feb. 11, 1985, entitled "Vibration Damper Apparatus"; 730,770, filed on May 3, 1985, entitled "Hydraulic Damping Rubber Engine Mount"; 735,452, filed on May 17, 1985, entitled "Adjustable Hydraulic Shock Absorber"; 736,803, filed on May 22, 1985, entitled "Collision Damper Having a Damping Piston and a Deformable Tube Connected Thereto": 766,871 filed on Aug. 16, 1985, entitled "Apparatus for the Determination of the Distance Traveled by a Piston in a Cylinder"; 778,606, filed on Sept. 20, 1985, entitled "Hydraulic Adjustable Shock Absorber" and 772,316, filed on Sept. 4, 1985, entitled "Hydraulic Vibration Damper Having Adjustable Damping Valve" for the adjustment of the clock adjustment signal, which are incorporated by reference as if the entire contents thereof were fully set forth herein. A computer such as that shown in U.S. Ser. No 778,606, may be used to adjust the signals shown to come from outside the circuitry of FIG. 6. Also, the pulse width adjustment signal at the terminal 114 may also be adjusted by these same ways as the clock adjustment signal entering a terminal 120 of the clock adjustment circuit. Circuits analogous to the circuits 110 through 118 may be connected to a second electromagnet 11b of the second valve body 10. These circuits which are designated by the reference numerals 110b through 118b, correspond to the circuits as originally described above with regard to the circuits connected to the electromagnet 11a. There also may be interconnections between the adjustable pulse width circuits in order that both electromagnets do not open up simultaneously, or that under special conditions, they will open up simultaneously. Additional circuits such as a pulse width adjustment signal at 114 and 114b may be interconnected so that the pulse widths of each electromagnet 11a and 11b are different. Also, the clock circuits may wish to have different clock period starting times in order that not both of the electromagnets 11a and 11b open up and close simultaneously for which purpose a non-coincidence circuit 122 is preferably provided, which is preferably connected to the clock circuits 116 and 116b and to the adjustable pulse width circuits 112 and 112b whereby the initial edges of the pulses are non-coincident with one another. The non-coincidence circuit 122 can also adjust the falling edge of the pulses to assure non-coincidence of these as well.

Also, one set of circuits 110 through 118 or 110b through 118b may be shut down and only one set may be activated. In the event that only one electromagnet is used in an installation, only one set of circuits 110 through 118 need be provided.

Figure 7:
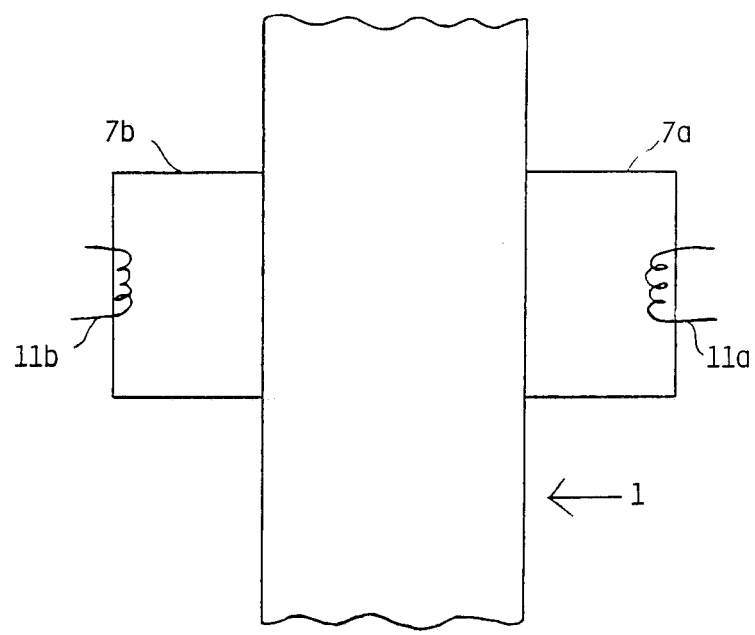
FIG. 7 shows the hydraulic shock absorber of FIG. 1 with two damping valves.

Going now to FIG. 7, the shock absorber strut 1 (illustrated in FIG. 1) is shown with a first damping valve 7a and a second damping valve 7b connected thereto. The damping valves 7a and 7b, each having an electromagnet 11a and 11b corresponding to those in FIG. 6, are substantially identical to the damping valve 7 shown in FIG. 1.

The shock absorber 1' illustrated in FIG. 8 is a two-tube telescoping strut. It comprises essentially a damping piston 2', a piston rod 3' and a working cylinder 4'. The damping piston 2' divides the working cylinder 4' into an upper working chamber 5' and a lower working chamber 6'. The damping piston 2' is also equipped with damping valves. In the bottom of the working cylinder 4', there are additional valves, by means of whose cross sections the volume displaced by the piston rod is displaced into an equalization chamber 17'. The equalization chamber 17' is formed by the wall of the working cylinder 4' and the inside wall of a jacket tube 18'.

There is a flow connection into the equalization chamber 17' from the top working chamber 5', via a passage 19', a bypass 20', and past a valve 7'. In this flow connection, the valve 7' controls a variable fluid circulation.

FIG. 9 shows a section of the shock absorber 1', whereby the piston rod 3' is located in the center and the upper working chamber 5' is connected via the passage 19' and the bypass 20' with the equalization chamber 17'. The bypass 20' is formed in this embodiment by a locally polished tube.

FIG. 10 shows the valve 7' in section, whereby the working cylinder 4', together with a tube 21', forms the bypass 20'. Starting from bypass 20', the fluid flows into the valve via an inflow hole 22'; then the damping medium flows past a valve body 8' on a valve seat 16', through outflow holes 23' and then past a diaphragm 24' into the equalization chamber 17'. The valve 7' itself, by interaction of an electromagnet 25', a spring 26' and the hydraulic pressure, controls the valve body 8' which influences a passage 9'. A recess 11' in the valve body 8' guarantees a pressure equalization between a rear end surface 10' and an end surface 14' of the valve body 8'. On account of the special configuration, a seat surface 13' is formed at approximately right angles to the axis of rotation 12' of the valve body 8', and the seat surface 13' is at a distance E from the end surface 14' of the valve body 8'. On account of the configuration of the end surface 14', during the flow of the damping medium from the inflow hole 22' into the outflow holes 23', a partially reduced pressure results at the valve seat 16'. The closing action of the valve spring 26' is reinforced by the differential pressure.

Embodiments are possible in which the flow into the valve body 8' via the flow passage 9' could conceivably come radially from its outside. In such cases, taking advantage of an annular surface 27', a force can be applied to the valve body 8' which also reinforces the valve spring 26'.

FIG. 11 shows a valve body 8', in which the end surface 14' is partly conical and in which there is an annular surface 27' on the outside surface of the valve body 8'. The valve seat 16' thereby forms a control edge, together with the seat surface 13'. The embodiment of this valve body 8' thereby exhibits an end surface 14', whose inside diameter 28' at the maximum equals an outside diameter 29' of the valve body 8'. The plane portion of the end surface 14' of the valve body 8' thereby runs from the valve seat 13' at the distance E.

In the embodiment illustrated in FIG. 12, the valve body 8' is provided with a cylindrical outside surface, whereby the end surface 14' is separated by the distance E from the valve seat 13', so that the valve seat 16' is formed by the choice of the diameter of the end surface 14'.

The variant illustrated in FIG. 13 represents a conical end surface 14', whereby again, there is an annular surface 27' on the outside surface of the valve body 8'. By way of contrast, FIG. 14 shows an end surface 14' oriented at approximately right angles to the axis of rotation 12' of the valve body 8', whereby again, the annular surface 27' indicates that these valve bodies 8' are used, among other things, in cases where the flow into the valve body comes from outside.

FIG. 15a shows the cylindrical valve body 8' with a plane end surface 14'. The seat surface 13' has a recess 15' in the adjacent area, so that on account of this configuration, again, the end surface 14' of the valve body 8' is at a distance E from the corresponding countersurface. The seat surface 13' thereby simultaneously determines the geometry of the valve seat 16'. FIG. 15b shows a conical recess 15'. The distance E is preferably in the order of less than about one millimeter and more preferably in the order of a plurality of tenths of a millimeter and even more preferably about 0.5 to about 0.6 of a millimeter. The diameter of the valve body 8' is preferably in the order of a plurality of millimeters in diameter and more preferably in the order of 3-4 millimeters. The width of the valve seat 16' is preferably in the order of tenths of a millimeter or a number of hundredths of a millimeter and is more preferably about one-tenth of a millimeter.

The geometry of all the valve bodies 8' in FIGS. 11 to 15 shows that in the vicinity of the valve seat 16', there is a narrower cross section than in the corresponding adjacent regions. On account of this geometry, when the valve body 8' is open, there is an increase in the velocity of the damping medium in the vicinity of the valve seat 16', so that during flow, a corresponding differential pressure in the vicinity of the valve seat 16' compared to the adjacent region reinforces the valve spring 26'.

A number of seals are shown in FIG. 10 to seal the hydraulic damping fluid in its appropriate chambers.

The invention as described hereinabove in the context of the preferred embodiments is not to be taken as limited to all of the provided details thereof, since modifications and variations thereof may be made without departing from the spirit and scope of the invention.

What is claimed is:

1. A shock absorber for motor vehicles, said shock absorber comprising a cylinder assembly having an arrangement for varying damping of a piston assembly disposed therein, said piston assembly dividing said cylinder into at least two chambers, each for containing damping fluid, said shock absorber comprising:
   means for throttling said damping fluid when said damping fluid moves from one of said chambers into another;
   said piston assembly having a piston rod and piston;
   said piston rod having first means for attachment of said piston rod at one end thereof;
   said cylinder assembly having second means for attachment at a portion thereon other than said first means for attachment at said piston rod;
   means for bypassing damping fluid;
   means for accepting bypassed damping fluid;
   said bypassing means being disposed to bypass said damping fluid from one of said damping fluid-containing chambers to said accepting means;
   said bypassing means including valving means for regulating flow of said damping fluid in said bypassing means;
   said valving means including:
   an electromagnetically-displaceable component for effecting flow cross section in said valving means, said electromagnetically-displaceable component having a first and a second end surface means;
   electromagnetic means for displacing said electromagnetically-displaceable component, said electromagnetic means having means for connection to electrical controlling means;
   valve seat means including a stationary seating surface means and a first portion of said first end surface means of said electromagnetically-displaceable component;
   said first portion of said first end surface means for making contact with said stationary seating surface means;
   said electromagnetically-displaceable component being axially displaceable along a first axis;
   said seating surface means having at least one portion being disposed substantially at a right angle to said first axis;
   a second portion of said first end surface means of said electromagnetically-displaceable component being disposed within said first portion of said first end surface means and a predetermined distance (E) away from said first portion of said first end surface means, to form a cavity; and said second portion of said first end surface means to form said cavity being disposed to form during flow of fluid through said valving means a pressure reduction to assist in closing said electromagnetically-displaceable component against said valve seat means.

2. The shock absorber according to claim 1, wherein said electromagnetically-displaceable component has a cylindrical outer surface.

3. The shock absorber according to claim 2, wherein said electromagnetically-displaceable component has a second end surface means at an end thereof opposite said first end surface means, said second portion of said first end surface means having a surface which is smaller than a surface of said second end surface means.

4. The shock absorber according to claim 3, wherein said first portion of said first end surface means is round and has an outer diametral dimension;

said electromagnetically-displaceable component includes and intermediate portion, between said first and said second end surface means, having an outer diametral dimension;

said second end surface means also having an outer diametral dimension;

said outer diametral dimension of said first end surface means being greater than the outer diametral dimension of said intermediate portion.

5. The shock absorber according to claim 4, wherein said second portion of said first end means comprises a conical surface region.

6. The shock absorber according to claim 5, wherein said second portion of said first end means comprises a planar region and including a recess disposed on said displaceable component, between said second portion of said first end means and said second end surface means.

7. The shock absorber according to claim 3, wherein said second portion of said first end surface means has a surface area, and the surface area of said second portion is no greater than the surface area of said second end surface means.

8. The shock absorber according to claim 7, wherein said second portion of said first end means comprises a conical surface region.

9. The shock absorber according to claim 8, wherein said second portion of said first end means comprises a planar region and said outer cylindrical surface including a recess disposed between said second portion of said first end means and said second end surface means.

10. The shock absorber according to claim 1, wherein said electromagnetically-displaceable component has a second end surface means at an end thereof opposite said first end surface means, said second portion of said first end surface means having a surface which is smaller than a surface of said second end surface means.

11. The shock absorber according to claim 1, wherein said first portion of said first end surface means is round and has an outer diametral dimension;

said electromagnetically-displaceable component includes an intermediate portion, between said first and said second end surface means, having an outer diametral dimension;

said second end surface means also having an outer diametral dimension;

said outer diametral dimension of said first end surface means being greater than the outer diametral dimension of said intermediate portion.

12. The shock absorber according to claim 1, wherein said second portion of said first end surface means comprises a conical surface region.

13. The shock absorber according to claim 1, wherein said second portion of said first end means comprises a planar region and including a recess disposed on said displaceable component, between said second portion of said first end means and said second end surface means.

14. The shock absorber according to claim 2, wherein said first portion of said first end surface means is round and has an outer diametral dimension.

15. The shock absorber according to claim 10, wherein said first portion of said first end surface means is round and has an outer diametral dimension.

* * * * *